United States Patent [19]

Lee

[11] Patent Number: 5,912,767
[45] Date of Patent: Jun. 15, 1999

[54] DIFFRACTIVE INDICIA FOR A SURFACE

[75] Inventor: Robert Arthur Lee, East Burwood, Australia

[73] Assignee: Commonwealth Scientific and Industrial Research Organisation, Australia

[21] Appl. No.: 08/624,536

[22] PCT Filed: Nov. 23, 1994

[86] PCT No.: PCT/AU94/00723

§ 371 Date: Apr. 12, 1996

§ 102(e) Date: Apr. 12, 1996

[87] PCT Pub. No.: WO95/14954

PCT Pub. Date: Jun. 1, 1995

[30] Foreign Application Priority Data

Nov. 23, 1993 [AU] Australia .............................. PM 2572

[51] Int. Cl.$^6$ ............................. G02B 5/18; B42D 15/10
[52] U.S. Cl. .................. 359/567; 359/2; 359/572; 359/574; 283/91; 283/93; 283/902
[58] Field of Search ......................... 359/2, 3, 567, 359/569, 572, 574; 283/85, 91, 93, 902

[56] References Cited

U.S. PATENT DOCUMENTS

| 3,463,118 | 8/1969 | Wood | 359/567 |
|---|---|---|---|
| 3,567,561 | 3/1971 | Wood | 161/34 |
| 3,580,657 | 5/1971 | Sheridon | 350/3.5 |
| 4,155,627 | 5/1979 | Gale et al. | 350/162 R |
| 4,402,571 | 9/1983 | Cowan et al. | 350/162.17 |
| 4,417,784 | 11/1983 | Knop et al. | 350/162.19 |
| 4,547,002 | 10/1985 | Colgate, Jr. | 283/85 |
| 4,589,686 | 5/1986 | McGrew | 283/85 |
| 5,032,003 | 7/1991 | Antes | 350/162.18 |
| 5,128,779 | 7/1992 | Mallik | 383/93 |
| 5,142,383 | 8/1992 | Mallik | 359/2 |
| 5,145,212 | 9/1992 | Mallik | 283/86 |
| 5,291,317 | 3/1994 | Newswanger | 359/567 |
| 5,296,949 | 3/1994 | Pennace | 359/2 |
| 5,301,062 | 4/1994 | Takahashi et al. | 359/569 |
| 5,335,113 | 8/1994 | Jackson et al. | 359/569 |

FOREIGN PATENT DOCUMENTS

| 4484064 | 11/1965 | Australia . |
|---|---|---|
| 8264382 | 10/1983 | Australia . |
| 1895783 | 3/1984 | Australia . |
| 1957683 | 4/1984 | Australia . |

(List continued on next page.)

OTHER PUBLICATIONS

M. T. Gale, "Sinusoidal Relief Gratings for Zero–order Reconstruction of Black–and–white Images", *Optics Communications*, vol. 18, No. 3, Aug. 1976, p. 292.

K. Knop and M. T. Gale, "ZOD Micro–Images:Colour and Black–and–white Image Reproduction from Surface Relief Grating Structures", *Journal of Photographic Science*, vol. 26, 1978, p. 120.

R. Barton, "Bicentenary banknote is a forger's nightmare", *The Age*, Dec. 16, 1987.

B. A. Hardwick, "Performance of the Diffraction Grating on a Banknote—The Experience with the Australian Commerative Note,".

*Optical Security and Anticounterfeiting Systems*, SPIE Proceeding, vol. 1210, 1990, p. 20.

*Primary Examiner*—Jon Henry
*Attorney, Agent, or Firm*—Ladas & Parry

[57] ABSTRACT

Diffractive indicia for a surface (1) comprising a plurality of small separate diffractive elements (2) and means for a adhering the diffractive elements to the surface. Each diffractive element has a diffractive surface relief structure and is not separately resolvable to the human eye. The appearance of the diffractive indicia, when applied to the surface, changes when the viewing angle and/or angle of illumination relative to the surface changes. In preferred arrangements, the diffractive indicia, are incorporated in an ink or a transfer medium. A palette of diffractive indicia with different characteristic colours and other optical properties may be provided.

14 Claims, 2 Drawing Sheets

FOREIGN PATENT DOCUMENTS

| | | |
|---|---|---|
| 6645186 | 6/1987 | Australia . |
| 6282890 | 3/1991 | Australia . |
| 5372990 | 10/1991 | Australia . |
| 8760382 | 6/1992 | Australia . |
| 3739093 | 9/1993 | Australia . |
| 1909692 | 1/1999 | Australia . |
| 240261 | 10/1987 | European Pat. Off. . |
| 240262 | 10/1987 | European Pat. Off. . |
| 467601 | 1/1992 | European Pat. Off. . |
| 493268 | 7/1992 | European Pat. Off. . |
| 3442794 | 8/1985 | Germany . |
| 1352001 | 5/1974 | United Kingdom . |
| 2219248 | 12/1989 | United Kingdom . |
| 8300395 | 2/1983 | WIPO . |
| 8707034 | 11/1987 | WIPO . |
| 9007133 | 6/1990 | WIPO . |
| 9103747 | 3/1991 | WIPO . |
| 9318419 | 9/1993 | WIPO . |
| 9324333 | 12/1993 | WIPO . |
| 9502200 | 1/1995 | WIPO . |

5,912,767

DIFFRACTIVE INDICIA FOR A SURFACE

This invention relates to diffractive indicia for a surface. It relates particularly to optically variable inks and optically variable elements which appear to change colour when the viewing angle and/or the angle of illumination is varied.

An important feature of several documents such as bank notes, credit cards, cheques and share certificates, is that they be difficult to reproduce by way of forgery. Because the range of available reproduction equipment and techniques is constantly improving, there is a continuing need for more and better anti-forgery security techniques.

One such anti-forgery security technique involves using indicia which incorporate optical variability. An optically variable document has an appearance which changes when the viewing angle and/or the angle of illumination changes. It is easy for a forger to reproduce a document which contains optically invariable images, but it is extremely difficult for a forger to incorporate optical variability into a reproduced document. One well known example of an optically variable device is the hologram diffractive device commonly used on credit cards.

A less well known type of security device is a colour switching ink provided by Sicpa Holding SA. After the ink has been applied to the surface of a document, it appears to be green when viewed from particular angles relative to a light source, and red when viewed from other angles, so that particular movements in viewing angle, lighting direction or document orientation result in a colour switch effect from green to red or red to green. It is believed that the colour switching Sicpa ink comprises a large number of small multi-layer interference elements. The layers have different refractive indices, and partial reflection occurs at the interface between each layer. The layer thicknesses, refractive indices and degrees of reflectiveness are chosen such that an optical interference effect occurs between the layers such that, for a given illumination direction, red light is reflected in a particular range of directions and green light is reflected in another range of directions. The colour switching ink provides an effective security device, but it is very difficult to make the multi-layer interference elements, and consequently, the ink is very expensive.

According to the present invention, there are provided diffractive indicia for a surface, comprising:
 (a) a plurality of small separate diffractive elements, and
 (b) means for adhering the diffractive elements to the surface wherein:
  each diffractive element has a diffractive surface relief structure; the diffractive elements, when applied to the surface, are not separately resolvable to the human eye; and
  the appearance of the diffractive indicia, when applied to the surface, changes when the viewing angle and/or angle of illumination relative to the surface changes.

In one preferred aspect of the invention, the diffractive indicia are incorporated in an ink, with the diffractive elements dispersed throughout the ink, the means for adhering is an ink binder which fixes the diffractive elements on the surface as the ink dries.

The ink binder may be any suitable binding agent. An ink is typically in the form of a liquid or a paste having a relatively volatile solvent which evaporates after the ink has been applied to the surface of a document. Ink also typically includes one or more colouring substances and a binding agent, which fixes the colouring substances in position on the document as the solvent evaporates.

The diffractive elements may be of any suitable shape and configuration. Each element has a surface which is embossed with a diffracting surface structure, and it is preferred although not essential that each element be in the form of an embossed foil, arranged such that the embossed surface structure is the same on-both sides. It is further preferred that the diffraction elements be substantially disc-shaped, although they may be of any suitable shape including square, triangular, rectangular, hexagonal and irregularly shaped.

The diffractive elements may be of any suitable size. It is preferred that the diffractive elements have linear dimensions of 30 micron or less, most preferably with linear dimensions of the order of 10 micron. A smaller size allows greater dispersion throughout the ink, but also reduces the scope for variability of surface structure. The diffractive elements may be in a range of different sizes, with smaller sizes typically providing less intense diffractive effects and larger sizes typically providing more intense effects.

The diffracting surface structure on each diffractive element may have any suitable shape, configuration and orientation. It may consist of grooves, pits, geometrically shaped indentations, or any combination of these. However, a straight line grating diffracts only in particular directions relative to the angle of illumination, whereas it is preferred for the purposes of the present invention that the diffractive effect be observable from any direction, so it is preferred that the diffracting structure be such as to cause diffraction in numerous different directions at the same time, and it is especially preferred that the diffracting structure comprise substantially concentric circular grooves. Other suitable structures include polygonal indentations arranged in substantially concentric circular patterns, and substantially concentric regular polygonal grooves.

In order to achieve particular optical effects, it is preferred that the spacing between adjacent grooves or indentations on the diffracting surface structures be modulated and/or of different spatial frequencies. Modulation may be used to achieve a two-colour switching effect of the type provided by the Sicpa ink, or it may be used to achieve various other effects such as differences in intensity when viewed from different viewing angles.

It is preferred that the ink be substantially transparent, apart from the diffraction elements; however, for some applications it may be desirable to have a degree of colouring in the ink. It is preferred that the diffraction elements have a high density distribution throughout the ink, resulting in a high colour intensity in the ink once it has been applied to a document.

It is preferred that the characteristics of the ink binder be such that it permits and assists the diffraction elements to be laid substantially flat against the surface of the document to which the ink has been applied, as the ink dries. Such orientation of the diffraction elements optimizes the diffraction effects observable in the ink.

In a preferred application of the invention, a palette of different optically variable inks is provided. Each ink in the palette has a different characteristic optically variable element, with the result that each ink in the palette produces a different diffractive colour effect when the ink has been applied to a surface. The palette of inks can be used to create an image which is multi-coloured and optically variable over a range of viewing angles.

In another aspect of the invention, the diffractive indicia are included on a transfer medium, which can be used to transfer them onto a surface. The transfer medium comprises a substrate on which the diffractive indicia are arranged, whereby the diffractive indicia can be applied from the transfer medium onto the surface by pressing portions of the transfer medium against the surface.

The transfer medium is analogous to a multi-colour ribbon in a typewriter or impact printer. A four-colour printer ribbon, for example, typically has its four colours arranged in four longitudinal strips. The print head is moved to the desired position for printing a character, the ribbon is moved up or down to select the desired colour, and the print head strikes the ribbon to transfer the coloured character to the surface being printed. The print head then moves on to the next position and the process is repeated.

Each colour on a multi-colour printer ribbon is analogous to one of the different types of optically variable diffractive elements on the transfer medium. The optically variable elements can be "printed" onto a surface by means of a "print head" pressing a region of the transfer medium which has optically variable elements of the desired "colour" against the surface.

The optically variable diffractive elements used in the transfer medium may have any of the characteristics of the elements used in the ink of the present invention as described above.

The optically variable diffractive elements may be attached to the substrate in any suitable manner. One suitable manner is by use of an adhesive. Another suitable manner is electrostatic attraction, or by a hot stamping process.

Another suitable manner is temporary heat bonding. In another suitable arrangement, the substrate itself may be comprised of the optically variable elements, so that they are applied to the surface by being "punched out" of the transfer medium.

The optically variable elements may be caused to adhere to the surface in any suitable manner. One suitable manner is by adhesion; another is by heat sealing.

The transfer medium may have any suitable shape and configuration. One suitable configuration is a tape, with the optically variable diffraction elements arranged in longitudinal strips along the length of the tape, each strip containing a plurality of elements of a single type. Another suitable configuration is a disc, with the optically variable elements arranged in sectors, each sector containing elements of a single type. It will be appreciated that the number of different possible configurations is unlimited.

The invention will hereinafter be described in greater detail by reference to the attached drawings which show example forms of the invention. It is to be understood that the particularity of those drawings does not supersede the generality of the preceding description of the invention.

Figure 1:
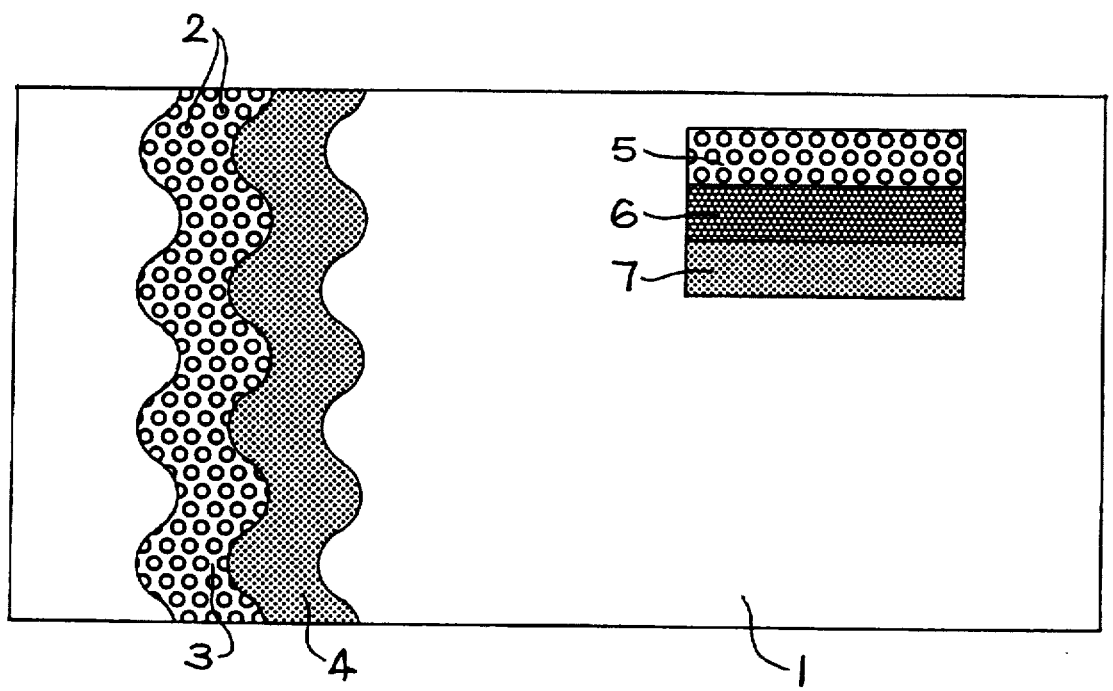
FIG. 1 is a schematic view of a surface bearing diffractive indicia according to the present invention.

The diffractive indicia of the invention comprise a plurality of small separate diffractive elements 2, shown in FIG. 1 as being applied to a surface 1. The diffractive indicia also comprise means for adhering diffractive elements 2 to surface 1.

Each diffractive element 2 has a diffractive surface relief structure. Examples of surface relief structures are discussed below with reference to FIGS. 2 to 7. Diffractive elements 2, when applied to surface 1, are not separately resolvable to the human eye. The appearance of the diffractive indicia on surface 1 changes when the viewing angle and/or angle of illumination relative to surface 1 changes.

Diffractive elements 2 are made from an embossed foil and have an embossed surface structure which is the same on both sides.

As shown in FIG. 1, a number of different diffractive elements are provided. The different types are selected from a palette of a number of different modulation types, different spatial frequency types or different sizes with fixed spatial frequency. Each of areas 3, 4, 5, 6 and 7 on surface 1 is filled with a single type of diffractive element, giving that area a distinct appearance which, depending upon the modulation effect used, may appear to have one colour when viewed from one range of directions and another colour when viewed from another range of directions. Different areas may also appear to have different intensities, on account of different sizes of diffractive elements.

The diffractive elements 2 may be "printed" on surface 1 in such a way that one "picture" or pattern of areas is observable from one range of viewing angles and a different "picture" or pattern of areas is observable from a different range of viewing angles. This "picture-switch" effect can be achieved through the use of diffractive elements having different spatial frequencies. Under given illumination conditions, a diffractive element with a given spatial frequency generates diffractive effects which are observable from particular viewing angles. A diffractive element with a different spatial frequency under the same illumination conditions generates diffractive effects which are observable from different viewing angles. Accordingly, a "picture-switch" effect can be created on a surface by "printing" a first "picture" using diffractive elements of a first average spatial frequency and "overprinting" the surface with a second "picture" using diffractive elements of a second average spatial frequency. The image observed will switch between the first "picture" and the second "picture" as viewing angle is changed.

Figure 2:
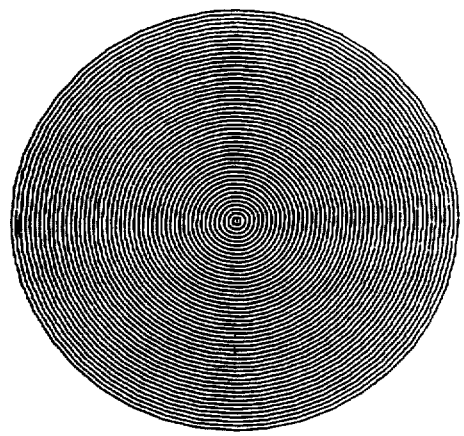
FIGS. 2 to 7 are computer generated illustrations of diffracting surface structures suitable for optically variable diffractive indicia according to the present invention.

FIG. 2 illustrates a regular concentric circular groove pattern. The spacing between grooves is preferably of the order of 0.4 to 0.6 micron. The groove pattern is embossed into one surface of a thin piece of foil, so a similar groove pattern occurs on the opposite surface. Because the pattern illustrated in FIG. 2 is unmodulated, when the diffracting surface structure is illuminated from a particular direction, diffracted light ranging through the spectrum from blue through to red will be observable around the diffracted element.

Although the grooves are illustrated as being continuous, this is not essential, and the surface structure may instead be made from discontinuous arcs, short straight lines or geometrical shapes, all arranged in a broadly concentric circular configuration.

Figure 3:
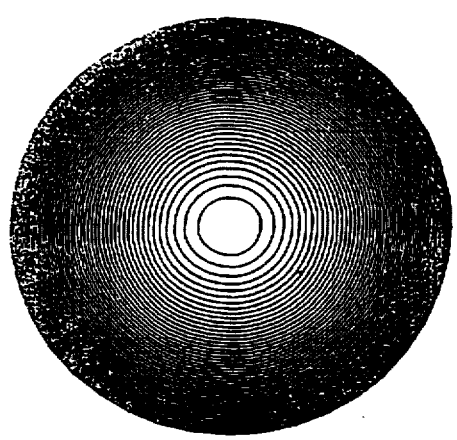

FIG. 3 is a computer plot of a concentric circular groove configuration, with the inter-groove spacing being modulated according to the formula:

$$r' = \sqrt{m},$$

wherein r' is the radius of a circular groove and m is the groove index number.

Figure 4:
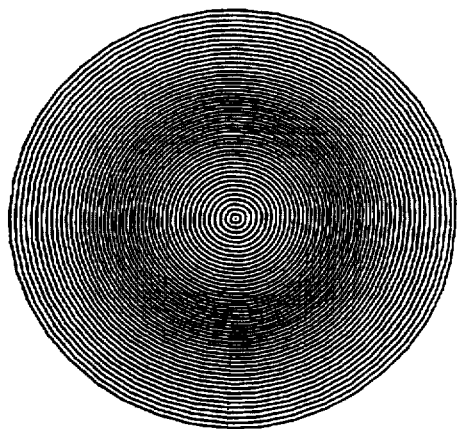

FIG. 4 shows another type of modulation suitable for use in the diffracting surface structure. The modulation illustrated in FIG. 4 is given by the general equation:

$$r' = \frac{ma}{n} + \beta \sin\frac{Q2\pi m}{n}$$

where m is the groove index number, n is the total number of grooves, $\beta$ is a modulation factor which relates to the intensity of colour, a is the distance between grooves and Q is the number of cycles of modulation. In the example illustrated, $\beta$ has a value of 0.03.

Figure 5:
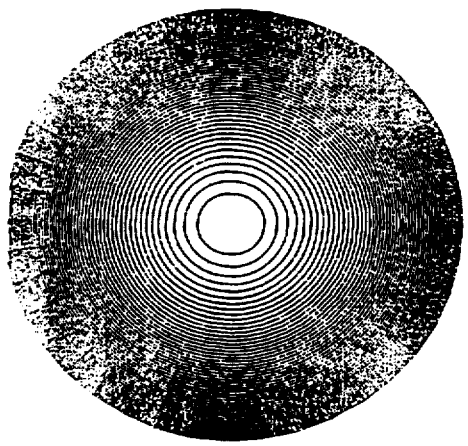

FIG. 5 is a computer plot of another modulated concentric circle diffracting surface structure configuration. The modulation factor in this instance is given by the equation:

$$r' = \sqrt{m} + \beta\cos\frac{2\pi m}{n}$$

and once again in this case, B has a value of 0.03.

Figure 6:
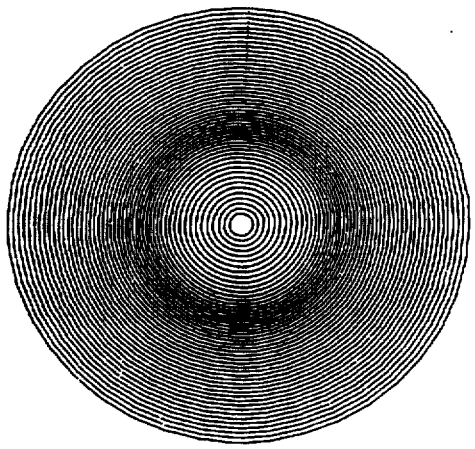

The modulation equation relating to the groove pattern depicted in FIG. 6 is as follows:

$$r' = \frac{m}{n} + \beta e \sin\frac{2\pi m}{n}$$

where B has a value of 0.03.

Figure 7:
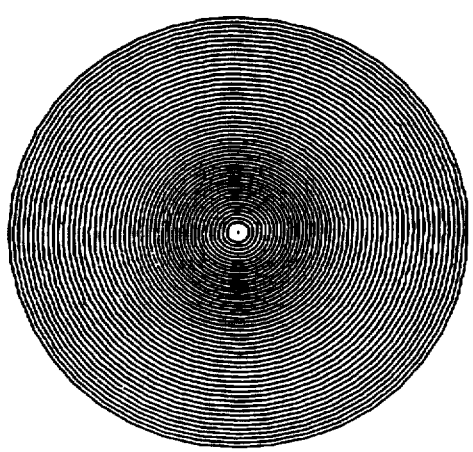

FIG. 7 shows yet another modulated concentric circular groove configuration. In this instance, the modulation function is as follows:

$$r' = \frac{m}{n} + \beta\cos\frac{2\pi m}{n}$$

where B has a value of 0.03.

The modulation functions illustrated in FIGS. 2 to 7 are examples only, and it is to be understood that numerous other modulation functions can usefully be applied.

Although the preferred surface structure is shown as having a concentric circular configuration, it is not essential that the diffractive elements themselves have a circular shape, and they may be square, rectangular, triangular, or any other shape including irregularly shaped without substantially altering the effect of the modulated concentric circular surface structure.

As stated previously, it is preferred that the invention be used in the form of a palette of different "coloured" inks, each having its own characteristic type of diffractive element, or in the form of a transfer medium having several different regions, each having its own characteristic type of diffractive elements. In both cases the "colours" are varied between different coloured inks by varying the parameters a (the inter-groove spacing) and B (the modulation factor) in the diffracting elements. The use of several different "coloured" inks enables the production of multi-coloured diffractive images which are optically variable over a range of viewing angles.

It is to be understood that various alterations, additions and/or modifications may be made to the parts previously described without departing from the ambit of the invention.

I claim:

1. Diffractive indicia for a surface, comprising:
   (a) a plurality of small separate diffractive elements, and
   (b) means for adhering the diffractive elements to the surface, wherein:
      each diffractive element has, before being applied to the surface a diffractive surface relief structure;
      the diffractive elements, when applied to the surface, are not separately resolvable to the human eye; and
      the appearance of the diffractive indicia, when applied to the surface, changes when the viewing angle and/or angle of illumination relative to the surface changes.

2. Diffractive indicia according to claim 1 wherein the diffractive elements are made from an embossed foil.

3. Diffractive indicia according to claim 2 wherein the diffractive elements have an embossed surface structure which is the same on both sides.

4. Diffractive indicia according to any one of claims 1 to 3 wherein the diffractive surface relief structure is substantially concentric in configuration.

5. Diffractive indicia according to claim 1 wherein the spacing between indentations or protrusions on the diffractive surface relief structure of diffractive elements is modulated.

6. Diffractive indicia according to claim 5 wherein the modulation is such that the indicia appear to have one colour when viewed from one range of viewing and illumination conditions and another colour when viewed from another range of viewing and illumination conditions.

7. Diffractive indicia according to claim 6 wherein a palette of a number of different modulation types is provided, such that, when diffractive elements of different modulation types are applied separately to different areas of the surface, the surface appears to have a particular pattern of colours from one range of viewing and illumination conditions and the same pattern but different colours when viewed from another range of viewing and illumination conditions.

8. Diffractive indicia according to any one of claims 1 to 3 wherein a palette of a number of different spatial frequency types is provided such that, when diffractive elements of different spatial frequency types are applied separately to different areas of the surface, the different surface areas generate diffractive effects which are observable from different ranges of viewing and illumination conditions.

9. Diffractive indicia according to any one of claims 1 to 3 wherein a palette of a number of different diffractive element sizes is provided, such that, when diffractive elements of different sizes are applied separately to different areas of the surface, the intensity of light diffracted varies from surface area to surface area.

10. An ink incorporating diffractive indicia according to claim 1 wherein:
   the diffractive elements are dispersed throughout the ink; and
   the means for adhering is an ink binder which fixes the diffractive elements on the surface as the ink dries.

11. An ink according to claim 10 wherein, apart from the diffractive elements, the ink is substantially transparent.

12. A transfer medium, for transferring diffractive indicia according to claim 1 onto a surface, wherein the transfer medium comprises a substrate onto which the diffractive indicia are arranged, whereby the diffractive indicia can be transferred from the transfer medium onto the surface by pressing portions of the transfer medium against the surface.

13. A transfer medium according to claim 12 wherein a plurality of each of a predetermined number of different types of diffractive indicia are arranged in an ordered manner on the substrate.

14. A transfer medium, for transferring diffractive indicia according to claim 1 onto a surface, wherein the transfer medium comprises an array of diffractive indicia removably linked together, whereby selected ones of the diffractive indicia can be transferred onto the surface by pressing portions of the transfer medium against the surface.

* * * * *